(12) United States Patent
Lee

(10) Patent No.: US 7,704,582 B2
(45) Date of Patent: Apr. 27, 2010

(54) OPTICAL RECORDING MEDIUM

(75) Inventor: Kwang Lyul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 11/303,937

(22) Filed: Dec. 19, 2005

(65) Prior Publication Data

US 2007/0009700 A1 Jan. 11, 2007

(30) Foreign Application Priority Data

Jul. 6, 2005 (KR) .................... 10-2005-0060659

(51) Int. Cl.
*B32B 3/02* (2006.01)
*G11B 7/243* (2006.01)
*G11B 7/257* (2006.01)

(52) U.S. Cl. ............... 428/64.5; 428/64.6; 428/913; 430/270.13; 430/273.1; 430/945; 369/283; 369/288; G9B/7.143; G9B/7.189

(58) Field of Classification Search ....... 428/64.4–64.8, 428/64.5, 64.6, 913; 430/270.12, 270.13, 430/273.1, 945; 369/283, 288; G9B/7.143, G9B/7.189
See application file for complete search history.

(56) References Cited

U.S. PATENT DOCUMENTS 6,033,752 A * 3/2000 Suzuki et al. ............. 428/64.1
6,982,111 B2 * 1/2006 Mizushima et al. ........ 428/64.1
2005/0047302 A1 * 3/2005 Inoue et al. .................. 369/94

FOREIGN PATENT DOCUMENTS

| EP | 1367577 A1 | | 12/2003 |
|---|---|---|---|
| EP | 1 426 941 A1 | | 6/2004 |
| EP | 1426941 A1 | * | 6/2004 |
| JP | 2003-203338 A | | 7/2003 |
| JP | 2004-25496 A | | 1/2004 |
| KR | 10-2004-0020063 A | | 3/2004 |
| WO | WO 03/058612 A | * | 6/2003 |

* cited by examiner

*Primary Examiner*—Mark Ruthkosky
*Assistant Examiner*—Gerard T Higgins
(74) *Attorney, Agent, or Firm*—Birch, Stewart, Kolasch & Birch, LLP

(57) ABSTRACT

The optical recording medium according to one embodiment of the present invention includes a substrate, a reflective layer located on the upper side of the substrate and reflecting an incident laser beam, and an information recording layer located on the reflective layer. The information recording layer includes a first recording layer containing a compound in the form of $A_X B_{1-X}$ ($0.8 \leq X \leq 0.9$), wherein A is Ag and B is Sb and Te, and a second recording layer containing at least one element selected from the group consisting of Si, Sn, Sb and Ge. The laser beam is irradiated on the first recording layer prior to the second recording layer. Therefore, the optical recording medium of the present invention may provide high recording density and transmittance velocity suitable for BLU-RAY DISC system.

16 Claims, 11 Drawing Sheets
(3 of 11 Drawing Sheet(s) Filed in Color)

OPTICAL RECORDING MEDIUM

BACKGROUND OF THE INVENTION

1. Field of the Invention

The present invention relates to an optical recording medium. In particular, the present invention relates to a recordable optical recording medium that can densely record data as well as has high recording stability.

2. Description of the Related Art

With the advent of multimedia age comprehensively dealing with video signal including moving picture and stop picture, audio signal, and computer data information, package media including all kinds of discs like CD and DVD have been widely used. Recently, there have been active efforts to apply an optical recording medium to the recording media of mobile phone, digital camera, broadcasting, and movie.

The optical recording medium is divided into read-only memory (ROM) optical recording medium, recordable optical recording medium capable of recording information only once, and rewritable optical recording medium capable of writing, reading, and deleting information repeatedly.

The recordable optical recording medium can be applied for data backup or storage of broadcasting, movie, etc. As recording layer material of the recordable optical recording medium, organic material like dye or inorganic material may be used. Only, in case of using organic material as the recording layer material, a problem may be occurred in long term storage of data recorded in the optical recording medium.

As recording mechanisms of the recordable optical recording medium, a) a pit is generated when the recording layer material is burned, b) a pit is formed from expansion of the volume as the recording layer material is decomposed, c) a new phase is formed by solidifying after the recording layer is melted, or d) a new material (for example, silicide, germanium compound, or antimony compound) is formed by reaction on the contact surface with foreign material.

Also, multiple mechanisms may occur to generate the recording mark. In case the recording mark is generated by multiple mechanisms, if a laser beam is irradiated onto the optical recording medium, first material and second material in the recording layer may be mixed and changed to form different material from those of the recording layer.

In this case, data are recorded by optical property changed in the recording layer material, and the recorded data can be identified by change of reflectivity according to the changed optical property before and after recording.

In order for the multiple mechanisms to occur in the optical recording medium, the optical recording medium needs to have an internal structure to generate such mechanisms and a combination of the recording layer material suitable to the internal structure.

On the other hand, record medium for next generation requires very high recording density and transmittance velocity for data. The size of recording mark of the optical recording medium should be smaller than the present size to increase the recording density recorded in the optical recording medium. Thus, the laser wavelength irradiated onto the optical recording medium should be reduced to 450 nm or less, and the numerical aperture should be increased to 0.7 or more. Also, the data transmittance velocity should be much higher than the present one of between 30 Mbps and 35 Mbps.

In case of BD (BLU-RAY DISC) that is one of recording media for next generation, a recording layer material having characteristic of jitter acceptable within the ranges of recording linear velocity of between 5.28 m/s and 10.56 m/s and a laser power of between 3 mW and 7 mW at 405 nm wavelength should be included in the optical recording medium.

Particularly, the recordable optical recording medium having the above characteristic requires combination of the recording layer material in which, i) the contrast between recording mark and space in the optical recording medium should be high, ii) the recording sensibility should be high, iii) recorded mark should be stable, and iv) recording characteristics including noise and jitter of recording mark should be satisfied in BD system.

Also, in case the recording mark is made inside the optical recording medium by irradiated laser, combination of recording layer material is required to prevent the laser power needed for making recording mark from being too high.

SUMMARY OF THE INVENTION

An object of the present invention is to provide an optical recording medium in which recording mark can be made by multiple mechanisms in which different materials included in an information recording layer react at a contacting surface of each other to be formed as a new material.

Another object of the present invention is to provide an optical recording medium that has high recording sensibility and big contrast between recording mark and space as well as satisfies characteristic of BD.

Another object of the present invention is to provide an optical recording medium that has superior stability of recording mark and superior recording characteristic of jitter as well as satisfies characteristic of BD.

Another object of the present invention is to provide an optical recording medium which the laser power necessary for making recording mark is low.

The optical recording medium according to one embodiment of the present invention includes a substrate, a reflective layer located on the upper side of the substrate to reflect an incident laser beam, and an information recording layer located on the reflective layer. The information recording layer includes a first recording layer containing a compound in the form of $A_X B_{1-X}$ ($0.1 \leq X \leq 0.9$), wherein A is one element selected from the group consisting of Ni, Ag, W and Cr, and B consists of at least one element selected from the above group except the one element corresponding to A, and a second recording layer containing at least one element selected from the group consisting of Si, Sn, Sb and Ge. The laser beam is irradiated onto the first recording layer prior to irradiating onto the second recording layer.

The optical recording medium according to another embodiment of the present invention includes a substrate, a reflective layer located on the upper side of the substrate to reflect an incident laser beam, at least two information recording layers located on the reflective layer, and a separation layer formed between the information recording layers. The information recording layer includes a first recording layer containing a compound in the form of $A_X B_{1-X}$ ($0.1 \leq X \leq 0.9$), wherein A is one element selected from the group consisting of Ni, Ag, W and Cr, and B consists of at least one element selected from the above group except the one element corresponding to A, and a second recording layer containing at least one element selected from the group consisting of Si, Sn, Sb and Ge. The laser beam is irradiated onto the first recording layer prior to the second recording layer.

The optical recording medium of the present invention may provide high recording density and high transmittance velocity suitable for BD system by combining elements of the recording layer material.

Also, the optical recording medium of the present invention may provide high recording sensibility and contrast between recording mark and space as well as record data in high density.

Moreover, in the optical recording medium of the present invention, laser power necessary for making recording mark may be low. Further, the optical recording medium of the present invention may provide very stable recording mark and superior recording characteristic.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The above and other features and advantages of the present invention will become readily apparent by reference to the following detailed description when considered in conjunction with the accompanying drawings wherein.

DESCRIPTION OF EMBODIMENTS

Hereinafter, the preferred embodiments of the present invention will be explained in more detail with reference to the accompanying drawings.

Figure 1:
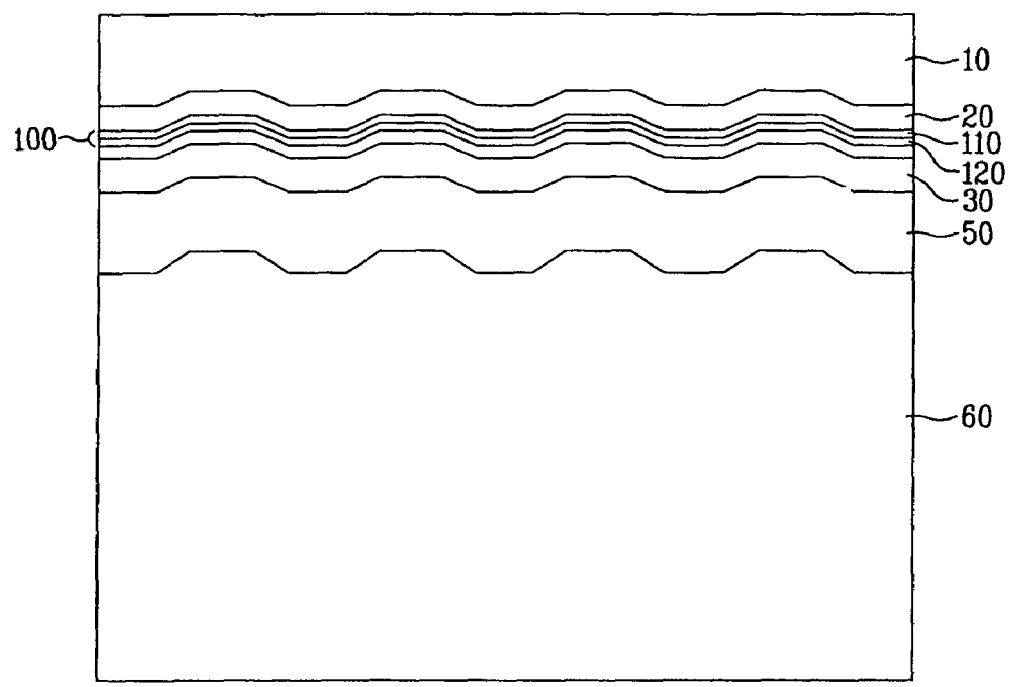
FIG. 1 is a sectional view illustrating the structure of the optical recording medium according to a first embodiment of the present invention.
Figure 2:
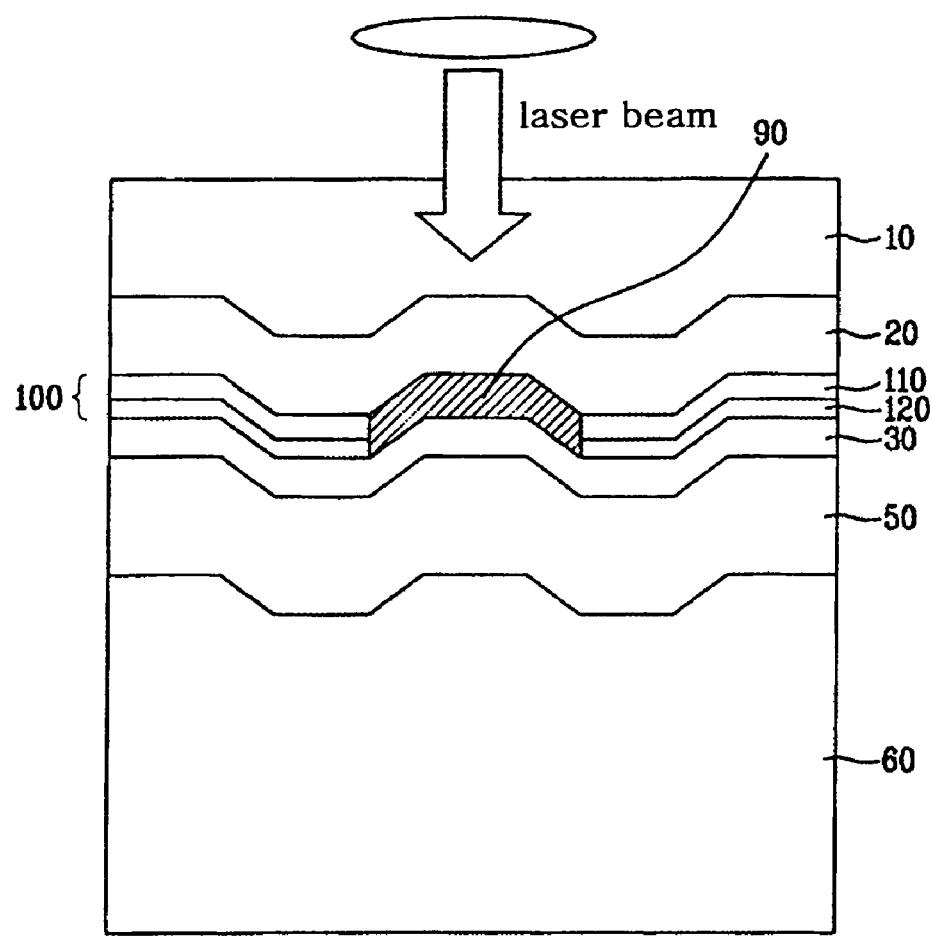
FIG. 2 is a sectional view illustrating one form of generated record mark in case of land recording to the optical recording medium of FIG. 1.
Figure 3:
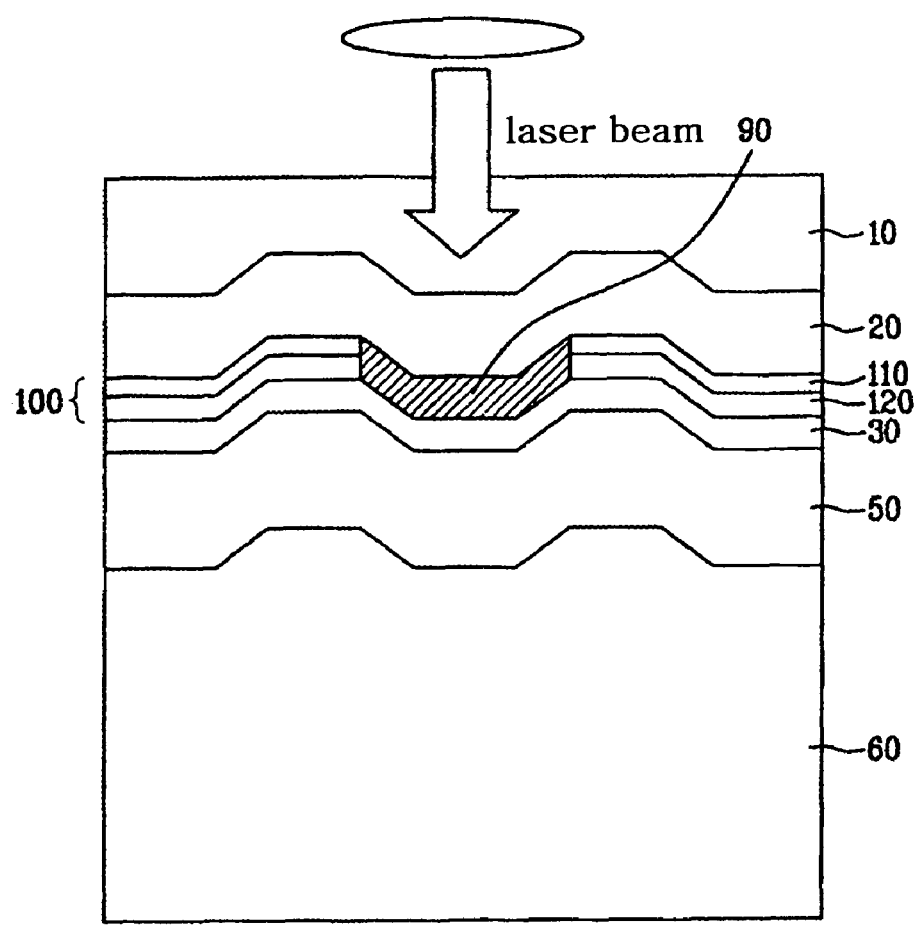
FIG. 3 is a sectional view illustrating one form of generated record mark in case of groove recording to the optical recording medium of FIG. 1.

FIG. 1 is a sectional view illustrating the structure of the optical recording medium according to a first embodiment of the present invention. FIG. 2 is a sectional view illustrating one form of generated record mark in case of performing land recording to the optical recording medium of FIG. 1. And, FIG. 3 is a sectional view illustrating one form of generated record mark in case of performing groove recording to the optical recording medium of FIG. 1.

In FIG. 1, the optical recording medium of the present invention includes a substrate 60, a reflective layer 50 and an information recording layer 100. It is desirable to further include an optical transmittance layer 10 and a dielectric layer 20, 30.

The substrate 60 plays a role to support a physical form of the optical recording medium. As material of the substrate 60, ceramic, glass, resin, etc. are generally used, and polycarbonate resin is preferable.

The reflective layer 50 is deposited on the substrate 60, reflects laser beam incident to the optical recording medium through the optical transmittance layer 10, and sends back the beam to the direction of the optical transmittance layer 10. Therefore, it is desirable that the optical transmittance layer 10 is consisted of a material having high reflectivity or alloy to which highly reflectible material is added.

The information recording layer 100 is deposited on the reflective layer 50. The information recording layer 100 includes a first recording layer 110 and a second recording layer 120.

Each material included in the first recording layer 110 and the second recording layer 120 forms a new material in mixture when the laser beam is irradiated thereon. The new material has totally different reflectivity from other materials around.

The first recording layer 110 may be positioned on or under the second recording layer 120. That is, it is not necessary that the first recording layer 110 is positioned to receive the first incident laser beam.

The first recording layer 110 is a compound in the form of $A_XB_{1-X}$ ($0.1 \leq X \leq 0.9$), wherein A is one element selected from a first group consisting of Ni, Ag, W and Cr, and B consists of at least one element selected from a second group except the element corresponding to A. The second group may further include Ge, Sb, Te, Al and Cu.

Preferably, the second recording layer 120 contains at least one element selected from the group consisting of Si, Sn, Sb and Ge. Also, it is preferable that the second recording layer 120 contains one element selected as a main element from the group consisting of Si, Sn, Sb and Ge, wherein the main element has an atomic percentage of 50 or greater.

When the laser beam is irradiated, the materials of the first recording layer 110 and the second recording layer 120 react each other at contact surface, and so a recording mark is formed.

Also, it is preferable that the dielectric layer 20 containing ZnS—SiO$_2$ is laminated on one side of the information recording layer 100. Further, it is preferable that the dielectric layer 30 containing ZnS—SiO$_2$ is laminated on the other side of the information recording layer 100.

In case the dielectric layer 20 is laminated on the side on which the laser beam is first irradiated in both contact sides of the information recording layer 100 (hereinafter, referred to as "lower dielectric layer"), the lower dielectric layer 20 plays a role to control reflectivity and contrast of the optical recording medium. Also, the lower dielectric layer 20 prevents damage of the optical transmittance layer 10 from temperature increase of the information recording layer 100. The lower dielectric layer 20 can be laminated to perform this function enough, and the preferable thickness of the lower dielectric layer 20 is 80 nm or less.

In case the dielectric layer 30 is laminated on closer side to the substrate 60 in both contact sides of the information recording layer 100 (hereinafter, referred to as "upper dielectric layer"), the upper dielectric layer 30 controls reflectivity and contrast of the optical recording medium. Also, in case the information recording layer 100 is irradiated on the laser beam, the upper dielectric layer 30 controls temperature distribution of the information recording layer 100 so that heat produced in the information recording layer 100 is emitted to the outside in a proper rate. The upper dielectric layer 30 can be laminated to perform this function enough, and the preferable thickness of the upper dielectric layer 30 is 50 nm or less.

FIG. 2 and FIG. 3 illustrate forms recorded to the optical recording medium in case of recording by irradiating the laser beam to the optical recording medium according to the first embodiment of the present invention.

Groove and land are formed on the surface of the information recording layer 100, and guide the laser beam irradiated onto the optical recording medium.

Land recording means that data are recorded onto the convex part of the information recording layer 100 as shown in FIG. 2, and recording mark 90 is formed on the part that the laser beam first arrives at among the surface of the information recording layer 100.

Groove recording means that data are recorded onto the concave part of the information recording layer 100 as shown in FIG. 3, and recording mark 90 is formed on the part that the laser beam later arrives at among the surface of the information recording layer 100.

Therefore, both land recording and groove recording are possible in the optical recording medium according to the present invention.

Figure 4:
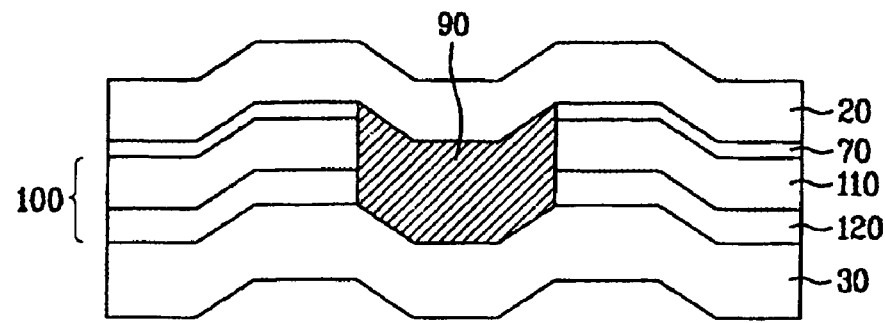
FIG. 4 is a sectional view illustrating one form of generated record mark in case of including a recording sensibility promotion layer in the optical recording medium according to a second embodiment of the present invention.

FIG. 4 is a sectional view illustrating one form of generated record mark in case a recording sensibility promotion layer is included in the optical recording medium according to a second embodiment of the present invention.

In FIG. 4, the recording sensibility promotion layer 70 may be laminated around or inside the information recording layer 100 in the optical recording medium according to the second embodiment of the present invention.

It is desirable that the recording sensibility promotion layer 70 contains at least one element selected from the group consisting of Sn, Zn, Pb, Bi, TI, Te, Se, S, Al, Ga, Ge, Cd, I, and In. These elements react earlier than material of the information recording layer 100 because their melting point is low when the laser beam is irradiated, and latent heat generated by state change at the time of reaction may be partially supplied for the heat necessary for reaction of the first recording layer 110 or the second recording layer 120.

Thus, in case the recording sensibility promotion layer 70 is laminated, the laser power necessary at the time of generating the recording mark 90 may be lowered.

The recording sensibility promotion layer 70 may be disposed on a side on which the laser beam is first irradiated, or closer side to the substrate 60 in both contact sides of the information recording layer 100, or between the first recording layer 110 and the second recording layer 120.

However, it is most desirable that the recording sensibility promotion layer 70 is laminated to contact a side on which the laser beam is first irradiated in both contact sides of the information recording layer 100 as shown in FIG. 4.

The other constitution is the same as the optical recording medium according to the first embodiment.

Figure 5:
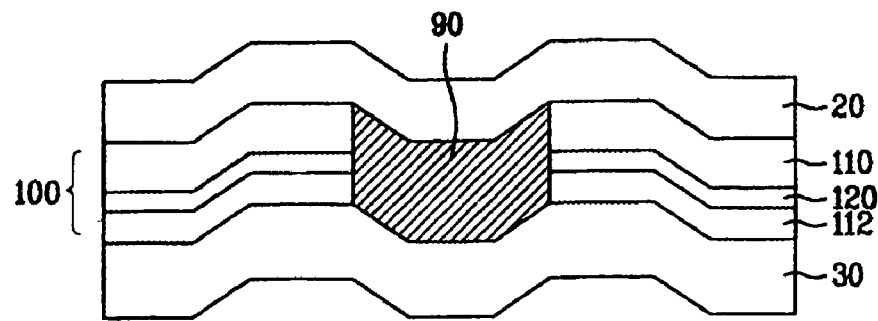
FIG. 5 is a sectional view illustrating one form of generated record mark in case of laminating a first recording layer and a second recording layer in turn in the information recording layer of the optical recording medium according to a third embodiment of the present invention.

FIG. 5 is a sectional view illustrating one form of generated record mark in case the first recording layer and the second recording layer are laminated in turn to the information recording layer of the optical recording medium according to a third embodiment of the present invention.

In FIG. 5, the optical recording medium according to the third embodiment of the present invention includes one or more first recording layers 110, 112, and one or more second recording layers 120 in the information recording layer 100. The first recording layers 110, 112 and the second recording layers 120 are laminated in turn so that their contact sides become two or more.

In such lamination, the reaction area between the first recording layer 110, 112 and the second recording layer 120 is increased so that the recording mark 90 is easily generated in the thickness direction of the optical recording medium.

Figure 6:
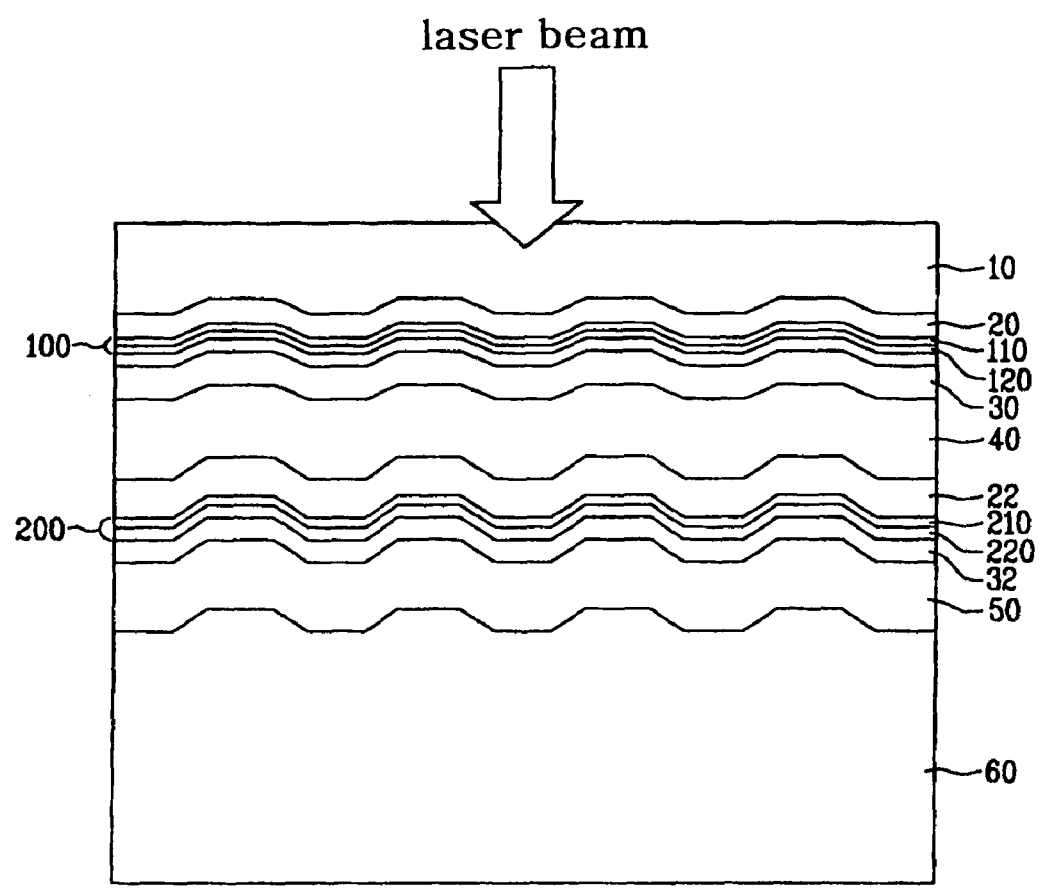
FIG. 6 is a sectional view illustrating the structure of the optical recording medium according to a fourth embodiment of the present invention.

FIG. 6 is a sectional view illustrating the structure of the optical recording medium according to a fourth embodiment of the present invention.

In FIG. 6, the optical recording medium according to the fourth embodiment of the present invention includes a substrate 60, a reflective layer 50, a separation layer 40 located between two and more information recording layers 100, 200 and each information recording layer 100, 200, and lower dielectric layer 20, 22 and upper dielectric layer 30, 32 laminated close to each information recording layer 100, 200.

Recording mark 90 may be formed in the information recording layers 100, 200 as described FIG. 2 to FIG. 5. Also, the lower dielectric layer 20, 22 and the upper dielectric layer 30, 32 may be laminated on a side on which the laser beam is first irradiated or a closer side to the substrate 60 in each information recording layer 100, 200 as shown in FIG. 1.

The information recording layers 100, 200 need not have the same structure. Thus, it is possible to let one or more first recording layers 110 and one or more second recording layers 120 be included in any one information recording layer (for example 100) in two or more information recording layers 100, 200, and the contact sides between the first recording layer 110 and the second recording layer 120 become two and more as the first recording layer 110 and the second recording layer 120 are laminated in turn. Also, it is also possible to make the recording sensibility promotion layer 70 be laminated, or further included, in only one information recording layer 100, 200.

In case the information recording layers 100, 200 are two or more, it is also possible to make the sum of thicknesses of first recording layer 110 and second recording layer 120 in one information recording layer 100 different from that of first recording layer 210 and second recording layer 220 in another information recording layer 200 except the above information recording layer.

Also, it is desirable that the ratio of thickness of first recording layer 110 to second recording layer 120 in one information recording layer 100 is different from that of first recording layer 210 to second recording layer 220 in another information recording layer 200 except the above information recording layer.

That is, it is desirable that in terms of transmittance, each thickness of two information recording layers 100, 200 is different. After the recording mark 90 is formed on the information recording layer 100 on which the laser beam is first incident, it is enough for the recording mark 90 to be formed on the other information recording layer 200 on which laser beam is second incident, with maintaining the laser power within a regulated range.

For example, if the thickness of the information recording layer 100 on which the laser beam is first incident corresponds to 40% and 60% of transmittance, the information recording layer 200 on which the laser beam is second incident may be formed in a thickness having 1% or less of transmittance.

Hereinafter, the test results to the optical recording medium according to the first to fourth embodiments will be described.

First, the structure and recording layer material of the optical recording media used for the test will be described.

The optical recording media used in the tests include a substrate 60 of a doughnut form of 15 mm of inside diameter, 120 mm of external diameter, and 1.1 mm of thickness, and 0.32 μm of track pitch having land and groove is formed on the substrate.

The substrate 60 is made of polycarbonate, and multiple thin layers are laminated on the substrate 60 in the order of reflective layer 50 made of Ag alloy, upper dielectric layer 30 consisted of $ZnS$—$SiO_2$, second recording layer 120, first recording layer 110, and lower dielectric layer 20 consisted of $ZnS$—$SiO_2$.

Also, the optical transmittance layer 10 is adhered by a polycarbonate cover sheet of 80 μm with PSA glue of 20 μm onto the lower dielectric layer 20. In the lamination, the thickness of the upper dielectric layer 30 is 60 nm, that of the second recording layer 120 is 6 nm, that of the first recording layer 110 is 6 nm, and that of the lower dielectric layer 20 is 60 nm.

The conditions of the above tests according to the first to fourth embodiments of the present invention are described below.

In the tests, the constant linear velocity of the optical recording media is 5.28 m/s, and the measuring position of the optical recording media was 30 mm from the inner circumference. The data recording to the optical recording medium was groove recording, the wavelength of laser beam used therein is 408 nm, and the reproduction power is set up at 35 mW. Also, as test apparatus, ODU-1000 of Pulstec Co., Ltd. was used.

In Table 1, combination of materials of recording layers 110, 120 in the optical recording medium as shown above and test results thereof are explained below.

TABLE 1

| Test NO. | The first recording layer | The second recording layer | The third recording layer | The dielectric layer | 8T modulation ($I8_{pp}/I8H$) (%) | determination | Start DC test power (mW) | determination | Mark stability determination |
|---|---|---|---|---|---|---|---|---|---|
| 1 | GeSbTe | Si | Ag | $ZnS$—$SiO_2$ | 45 | ○ | 3.0 | □ | ○ |
| 2 | GeSbTe | Ge | Ag | $ZnS$—$SiO_2$ | 40 | □ | 1.8 | ○ | □ |
| 3 | GeSbTe | Sb | Ag | | 50 | ○ | 1.5 | ○ | □ |
| 4 | GeSbTe | Sn | Ag | | 50 | ○ | 2.7 | ○ | ○ |
| 5 | AgInSbTe | Si | Au | $ZnS$—$SiO_2$ | 55 | ○ | 1.0 | ○ | □ |
| 6 | AgInSbTe | Ge | Au | $ZnS$—$SiO_2$ | 52 | ○ | 1.4 | ○ | □ |
| 7 | AgInSbTe | Sb | Au | | 38 | □ | 2.0 | ○ | ○ |
| 8 | AgInSbTe | Sn | Au | | 40 | □ | 4.0 | □ | □ |
| 9 | GeSbTe | Si | Cr | | 54 | ○ | 3.5 | □ | ○ |
| 10 | GeSbTe | Si | W | | 50 | ○ | 4.0 | □ | ○ |
| 11 | GeSbTe | Si | Ni | | 40 | □ | 4.0 | □ | ○ |
| 12 | GeSbTe | Sb | Mo | | 40 | □ | 3.0 | □ | ○ |

The first recording layer 110 and the second recording layer 120 each was consisted of Ag alloy and Si as main elements in Test 1; Ag alloy and Ge in Test 2; Ag alloy and Sb in Test 3; Ag alloy and Si in Test 4; W alloy and Si in Test 5; W alloy and Sb in Test 6; Ni alloy and Si in Test 7; and Ni alloy and Sb in Test 8.

The test standards according to each test combination are difference of reflectivity of the optical recording medium according to 8 T modulation, value of DC annealing power, saturated power range, and mark stability. The results according to each standard of Table 1 are marked as 'O', 'Δ' or 'x' in the right column of each test standard (own column for mark stability) in the order of test combination showing favorable result.

First, 8 T modulation indicates difference of reflectivity between space and mark of the optical recording medium.

That is, the difference ($I8_{pp}$) between minimum reflectivity value and maximum reflectivity value to 8 T modulation pulse of the laser beam divided by maximum reflectivity value (I8H) is expressed in percent (%). In the 8 T modulation test of laser beam, the difference of reflectivity is the first standard of optical recording medium. Thus, as its difference of reflectivity is bigger, it is more appropriate as optical recording medium.

Based on the test of the optical recording medium according to the present invention, the difference of reflectivity between space and mark of the recording layer of Au alloy and Si (Test 4) was best as high as 51.3%. And, the difference of reflectivity is changed in the recording layer of Ag alloy and Sb (Test 3), that of W alloy and Sb (Test 6), and that of Ni alloy and Sb (Test 8).

DC annealing power is a determination standard that can indirectly confirm whether an optical recording medium having optimized structure can be recorded as prescribed recording power (Pw).

BD should generate the recording mark 90 at the laser recording power within the range of less than 7 mW when it is recorded at a 1×, 2× velocity of the optical recording medium. For indirect confirmation, it is assumed that the optical recording medium has proper recording sensibility to the prescribed laser power if the measured power is between 1.5 mW and 2.5 mW by measuring power that any change in the first recording layer 110 and the second recording layer 120 begins.

Hereinafter, a specific method of measuring DC annealing power as determination standard will be described.

First, laser beam of space power (Ps(mW)) is irradiated to the optical recording medium. Pulse of the laser beam is single pulse type, not multiple pulse type. And, in case the laser beam is irradiated, the original size of reflectivity of the optical recording medium is measured as laser power to initiate change in the oscilloscope. The size of such measured laser power is the value of DC annealing power.

In the test, the optical recording medium is determined to be optimized if the DC annealing power is less than 2.5 mW. Also, in the test, the value of DC annealing power was shown best in the recording layer of Au alloy and Si (Test 4), second best in the recording layer of Ag alloy and Ge (Test 2), and third best in the recording layer of Ni alloy and Si (Test 7).

The saturated power range is a determination standard to indirectly confirm the range of temperature until the whole information recording layer 100 reacts since the layer 100 begins to react and the reacting area is widened to the direction of thickness of the optical recording medium.

If the saturated power range is high, the laser power range to get optimized recording characteristic may be out of prescribed condition though the temperature to begin the reaction is low. Also, recording control is difficult in the medium temperature range since change of reflectivity of the optical recording medium is big.

That is, the reflectivity of the optical recording medium to the laser power at the time of recording should be changed rapidly in a narrow power range. Thus, to select a material that the temperature change of the recording layers 110, 120 is completed in a narrow laser power range, the material of the recording layers 110, 120 having the saturated power range of less than 2 mW is determined as most proper material.

In the test, the recording layer of Ag alloy and Sb (Test 3) as main elements of the first recording layer 110 and the second recording layer 120 was determined as best recording layer, the recording layer of W alloy and Sb (Test 6) second, and the recording layer of Ni alloy and Sb (Test 8) third.

As a determination standard of the test, mark stability is a standard to determine whether the recording mark 90 can be maintained for a long time without any change in time. The size of recording mark 90 should be maintained without growing bigger or smaller in time under effect of the laser beam of regenerative power or room temperature when the recording mark 90 was formed to the optical recording medium by the laser pulse of 8 T modulation.

In the test, the recording mark 90 in the recording layers was changed when the main elements of the first recording layer 110 and the second recording layer 120 in the recording layers are Ag alloy and Sb (Test 3), W alloy and Sb (Test 6), and Ni alloy and Sb (Test 8). Thus, the material of the recording layers 110, 120 may be better by improving material ratio of the recording layers 110, 120 and structure of the optical recording medium.

According to the three test results, the combination of Ag, Ni and W, and Si as first recording layer 110 and second recording layer 120 may be said as best material for the information recording layer 100. However, combination of most of the above materials has a little large DC annealing power, and so they may be more desirable material for the information recording layer 100 if the recording laser power is lowered a little bit more.

Now, the test results to improve reflectivity and recording sensibility to the optical recording medium will be described in detail by combination of Ag and Si as main element of first recording layer 110 and second recording layer 120 among the combination of Ag, Ni, and W, and Si selected as proper materials through the tests.

First, the reflectivity and DC annealing power are measured by changing the ratio of thickness of first recording layer 110 and second recording layer 120, and the thickness of the dielectric layer 20, 30 at the laser regenerating power of 0.35 mW.

Figure 7:
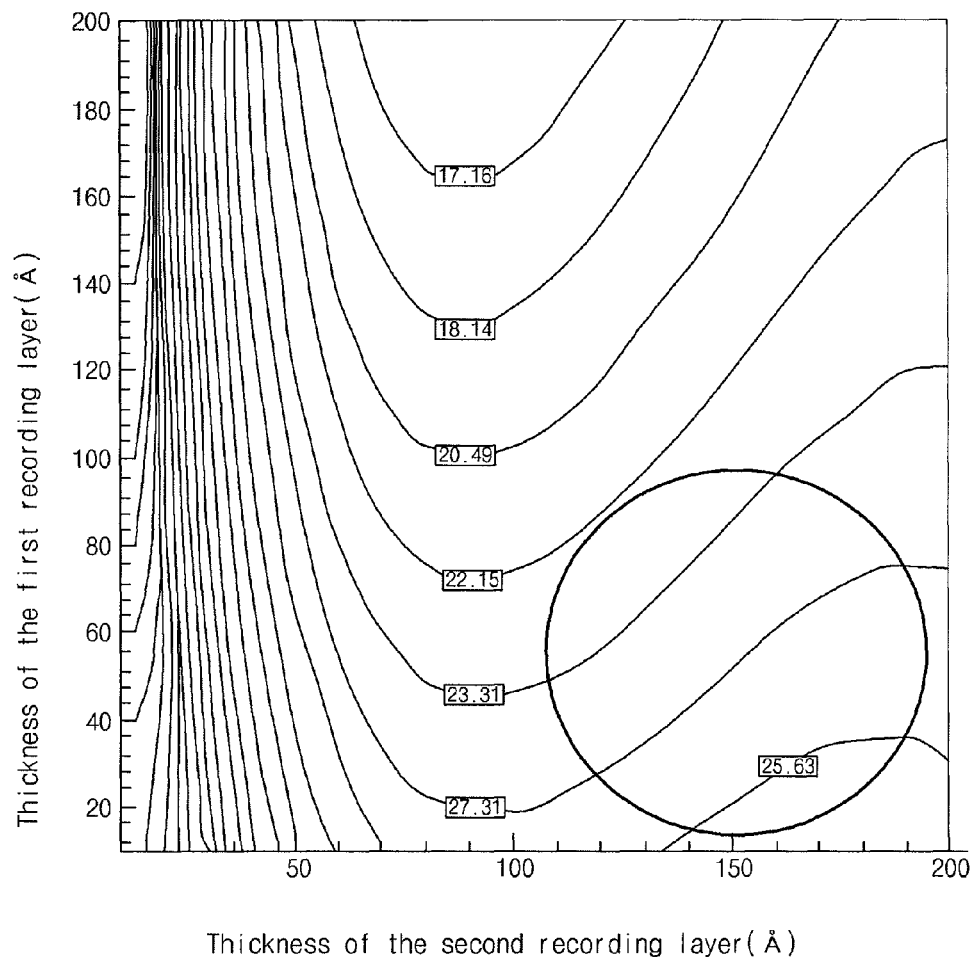
FIG. 7 is a view illustrating reflectivity result according to combination of thickness of the first recording layer consisted of Ag alloy and the second recording layer having Si as main element in the mock test.

FIG. 7 is a view illustrating reflectivity result according to combination of thicknesses of the first recording layer consisted of Ag alloy and the second recording layer consisted of Si as main elements in the test results.

In FIG. 7, the second recording layer 120 of the optical recording medium used in the test is alloy having Si as main element, and the first recording layer 110 is alloy having Ag as main element. The horizontal axis of FIG. 7 indicates the thickness of the second recording layer 120 as Å unit, the vertical axis of FIG. 7 indicates the thickness of the first recording layer 110 as Å unit, and the values shown in FIG. 7 indicates reflectivity according to the thickness of each recording layer 110, 120.

Figure 8:
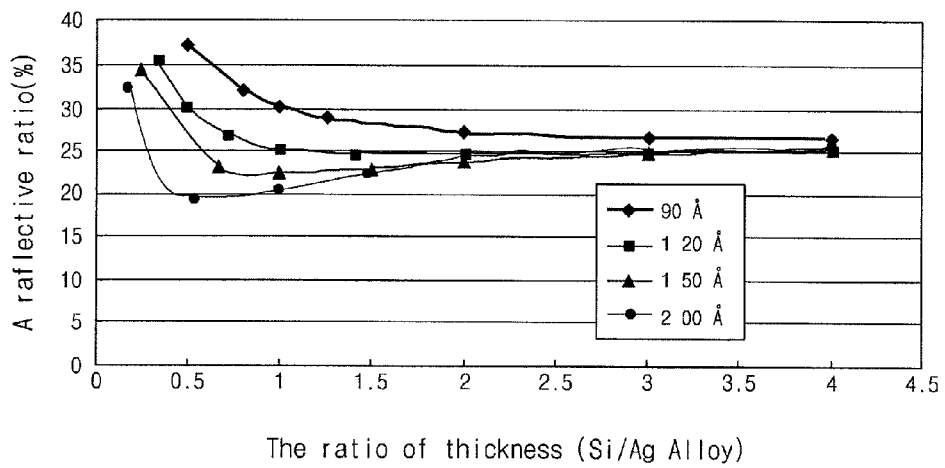
FIG. 8 is a view illustrating the test result of FIG. 7 by the ratio of thickness of the second recording layer to the first recording layer.

In case the thickness of the second recording layer 120 consisted of Si as main element is thicker than that of the first recording layer 110 consisted of Ag alloy in the results shown in FIG. 7 (red-colored circle part of the lower right of FIG. 7), change of the reflectivity according to the laser power of 0.35 mW is not big. FIG. 8 describes the result of FIG. 7 by a graph to thickness and reflectivity.

FIG. 8 is a view illustrating of reflectivity of the optical recording medium according to the ratio of thickness of the second recording layer consisting of Si as main element to the laser power to that of the first recording layer containing Ag alloy.

FIG. 8 indicates reflectivity of the optical recording medium according to the ratio of thickness of the second recording layer 120 containing Si as main elements to that of the first recording layer 110 containing Ag alloy. FIG. 8 also indicates reflectivity according to thickness of the whole recording layer. That is, a line connecting each point having different colors indicates reflectivity according to the whole thickness of the information recording layer 100.

If the total thickness of the information recording layer 100 is 90 Å and the ratio of thickness of the second recording layer 120—the first recording layer 110 (Si—Ag alloy) is 2, it means that in the formed information recording layer 100, the recording layer of Si is 60 Å and that of Ag is 30 Å.

According to FIG. 8, as the ratio of thickness of the second recording layer 120—the first recording layer 110 (Si—Ag alloy) is increased, the difference of reflectivity has constant value, is not changed, and is stable. Especially, in case the ratio of thickness of the second recording layer 120—the first recording layer 110 (Si—Ag alloy) is two or more (two or more in the horizontal axis of FIG. 8), reflectivity is stable in any case that the total thickness of the information recording layer 100 is 90 Å or more, and 200 Å or less (indicated as circle in FIG. 8).

Therefore, it is desirable that the thickness of the information recording layer 100 (thickness of the first recording layer 110 and the second recording layer 120) according to the optical recording medium of the present invention is 90 Å or more, and 200 Å or less, and the ratio of thickness of the second recording layer 120 to the first recording layer 110 is two or more. If the information recording layer 100 is designed within this desirable range, the design of thickness of the information recording layer 100 may be highly adaptable.

Hereinafter, the test results for recording sensibility of the optical recording medium of the present invention will be described.

Figure 9:
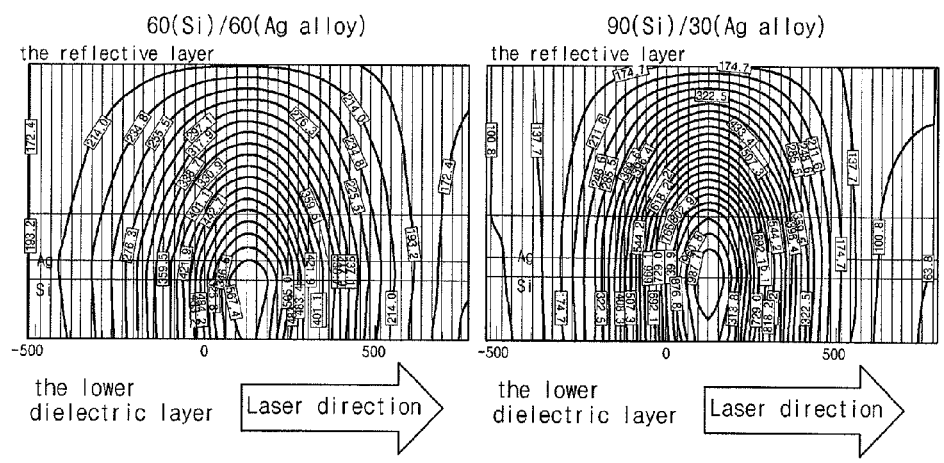
FIG. 9 is a view illustrating perpendicular temperature distribution shown in the track center of the optical recording medium by combination of thickness of the recording layer according to one embodiment of the present invention.

FIG. 9 is a view illustrating perpendicular temperature distribution indicated in the track center of the optical recording medium to thickness combination of the recording layers 110, 120 in the optical recording medium according to one embodiment of the present invention.

In FIG. 9, the left figure indicates temperature distribution in the perpendicular section of the track center of the optical recording medium in case the laser beam is irradiated to the optical recording medium wherein the ratio of thickness of the second recording layer 120 to the first recording layer 110 (Si/Ag alloy) is 1, and the thickness of each recording layer 110, 120 is 60 Å.

The right figure indicates temperature distribution in the perpendicular section of the track center of the optical recording medium in case the ratio of thickness of the second recording layer 120 to the first recording layer 110 (Si/Ag alloy) is 3, and the thickness of the second recording layer 120 (Si) is 90 Å and that of the first recording layer 110 (Ag alloy) is 30 Å.

Comparing the temperature distribution of the right figure with that of the left figure in FIG. 9, heat is more concentrated in the temperature distribution of the right figure than the left figure, and the temperature distribution of the right figure than the left figure is more in the perpendicular direction to the laser direction. And, Ag contained in the first recording layer 110 has high diffusion velocity of heat, and so the diffusion of heat to the track direction of the optical recording medium is not great, and the temperature distribution in the optical recording medium is narrowly indicated if the first recording layer 110 is thin, or the ratio of thickness of the second recording layer 120 to the first recording layer 110 is big.

Also, the diffusion velocity of heat in the information recording layer 100 is slower when the layer containing Ag is thin rather than thick, and so the temperature incline between Si of the second recording layer 120 and Ag of the first recording layer 110 is less occurred, which is advantageous in reacting these two materials. Thus, when the ratio of Si/Ag alloy used for the recording layers 110, 120 is big, temperature distribution is uniformly made in the information recording layer 100, and the heat is concentrated to increase the recording sensibility of the optical recording medium.

Figure 10:
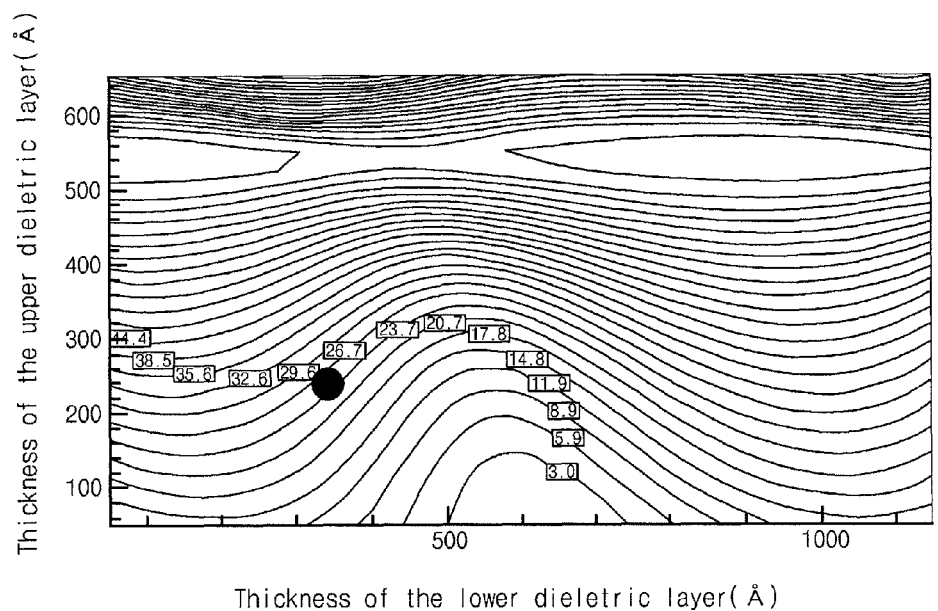
FIG. 10 is a view illustrating result of reflectivity change of the optical recording layer according to one embodiment of the present invention having the recording layer of Si (90 Å)/Ag (30 Å) in case the combination of thickness of upper dielectric layer and lower dielectric layer is changed.

FIG. 10 is a view illustrating the test result showing reflectivity according to thickness of upper and lower dielectric layers 30, 20 when the combination of thickness of the second recording layer 120/the first recording layer 110 in the information recording layer of the optical recording medium according to one embodiment of the present invention is Si (90 Å)/Ag (30 Å), and the thickness of reflectivity is 700 Å.

In FIG. 10, if the thickness of the lower dielectric layer 20 (the horizontal axis of FIG. 10) is 80 nm or less (800 Å), the reflectivity and contrast of the optical recording medium may be sufficiently controlled. Since the reflectivity according to thickness of the lower dielectric layer 20 has a period, when the thickness is 80 nm or more, the reflectivity for thickness thinner than 80 nm is repeated again. Also, when the lower dielectric layer 20 is too thick, the heat may affect the information recording layer 100 to bring undesirable effect.

Therefore, it is desirable that the thickness of the lower dielectric layer 20 is 80 nm or less.

In FIG. 10, when the thickness of the upper dielectric layer 30 in the vertical axis is 50 nm or more, the contrast of the optical recording medium may lower. Also, if the upper dielectric layer 30 is too thick, it is hard to control the shape of recording mark 90 and the length of each mark since the heat generated in the information recording layer 100 is not discharged well. Thus, it is desirable that the thickness of the upper dielectric layer 30 is 50 nm or less.

One embodiment for evaluating performance of the optical recording medium according to the present invention based on the test results may be as follows.

First, in the thickness combination of each layer of the optical recording medium according to the present invention, the second recording layer 120/the first recording layer 110 are set as Si (90 Å)/Ag alloy (30 Å), and the thickness of reflective layer 50 is set as 700 Å. Also, the thickness of the lower dielectric layer 20 was 325 Å, and that of the upper dielectric layer 30 was 225 Å (the thickness of the upper/lower dielectric layers 30, 20 indicated as red dots in FIG. 10).

The test result of real recording sensibility by using the optical recording medium having the thickness of each layer as shown above is indicated in FIG. 11.

Figure 11:
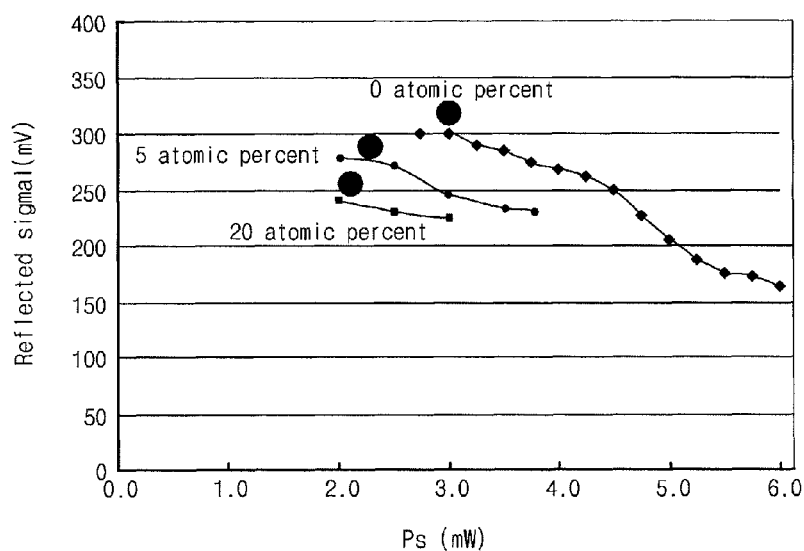
FIG. 11 is a view illustrating the result measuring recording sensibility by DC annealing power according to each addition ratio in case of adding Sb and Te to the first recording layer material (Ag) in the optical recording medium according to one embodiment of the present invention.

FIG. 11 is a view illustrating result to measure recording sensibility with DC annealing power according to each addition ratio in case of adding Sb and Te to the material (Ag) of the first recording layer 110 in the optical recording medium according to one embodiment of the present invention.

The recording sensibility of the optical recording medium was determined by measuring DC annealing power when varying the addition ratio of other element to the first recording layer 110 containing Ag as main element. Because Ag has high thermal conductivity, it is desirable to lower thermal conductivity of the first recording layer 110 by adding other element. If the DC annealing power is lowered at the time of adding other element to the first recording layer 110, the recording sensibility of the information recording layer 100 becomes higher.

The additional elements used in the above test were Sb and Te. In the ratio of additional elements, the atomic percentage was controlled by regulating power of the sputtering equipment, and a co-sputtering method was used.

In FIG. 11, in case of containing only Ag in the first recording layer 110, that is, in case that no other element is added, the result is shown as deep blue line, in case of adding combination of Sb and Te to Ag in 5 atomic percents, the result is indicated as light blue line, and in case of adding combination of Sb and Te to Ag in 20 atomic percents, the result is shown as violet line. Each line of FIG. 11 indicates a signal of reflectivity of the optical recording medium when the laser beam is irradiated to the optical recording medium according to the present invention. And, the DC annealing power (the minimum space power (Ps)) according to the ratio of additional elements is indicated as big red dot on each line.

As shown in FIG. 11, the higher the addition ratio of the additional elements of Sb and Te to Ag is, the lower the value of minimum space power (Ps) is. That is, the higher the addition ratio of other element to the first recording layer 110 is, the higher the recording sensibility is.

Next, the jitter test result according to the optical recording medium of the present invention having the structure described in FIG. 11 will be described.

First, the channel bit clock is set at 66 MHz, and the recording velocity of the optical recording medium is set at 5.28 m/s, as jitter measurement condition of the optical recording medium according to the present invention. The capacity of the optical recording medium was 23.3 giga bytes per information recording layer 100, and TA520 of Yokogawa Co. was used as jitter measuring equipment. The number of test sampling for measuring jitter was 30,000, the measuring position of the optical recording medium was selected at 30 mm from the inner circumference of the optical recording medium, and the land recording and groove recording were operated to the optical recording medium. Also, the wavelength of the recording laser beam to the optical recording medium was a wavelength of 408 nm.

Figure 12:
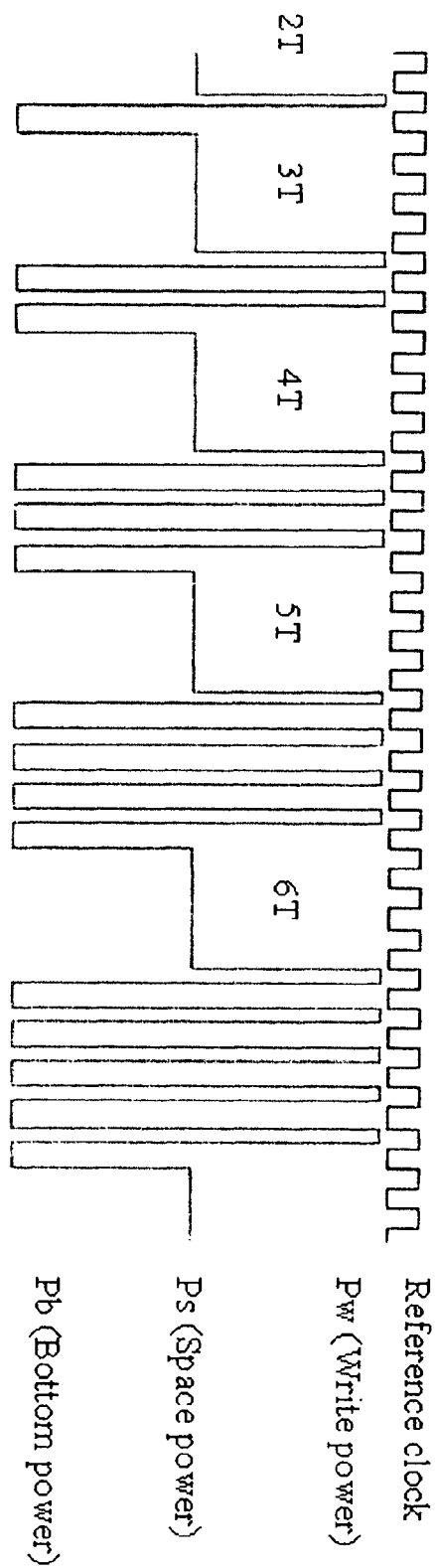
FIG. 12 is a view illustrating waveform of laser recording pulse used for data recording of the optical recording medium for performance evaluation of the optical recording medium according to one embodiment of the present invention.

FIG. 12 is a view illustrating waveform of a laser recording pulse used in the data recording of the optical recording medium for performance evaluation of the optical recording medium according to one embodiment of the present invention.

The recording power (Pw) of the laser pulse used for record of the optical recording medium was 5.7 mW, the space power (Ps) was 1.5 mW, and the bottom power (Pb) was 0.1 mW. The laser recording pulse has random multi pulse from 2 T to 6 T, and recording was done by modulating the pulse to make N−1 partition pulse to each recording pulse.

The eye pattern of the optical recording medium according to each addition element will be described in FIG. 13A to FIG. 13C.

Figure 13A:
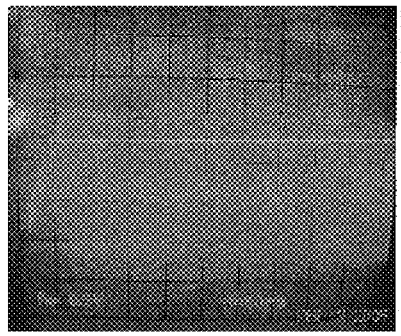
FIG. 13A is a view illustrating result of RF eye pattern of the optical recording medium according to one embodiment of the present invention consisted of the first recording layer material (Ag) alone.
Figure 13B:
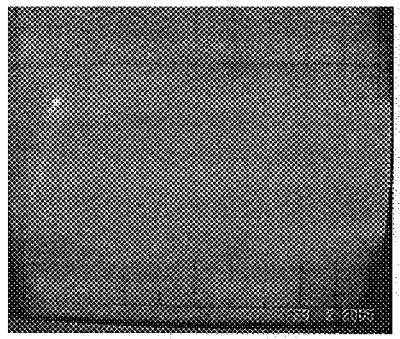
FIG. 13B is a view illustrating result of RF eye pattern of the optical recording medium according to one embodiment of the present invention in which Sb and Te are added in total 5 atomic percents to the first recording layer material (Ag)
Figure 13C:
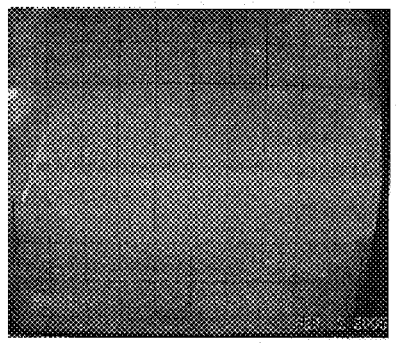
FIG. 13C is a view illustrating result of RF eye pattern of the optical recording medium according to one embodiment of the present invention in which Sb and Te are added in total 20 atomic percents to the first recording layer material (Ag)

FIG. 13A to FIG. 13C illustrate RF eye pattern according to each addition ratio in case of adding Sb and Te to Ag as material of the first recording layer 110. FIG. 13A illustrates RF eye pattern in case of not adding Sb and Te, FIG. 13B illustrates RF eye pattern when the addition ratio of Sb and Te is 5 atomic percents, and FIG. 13C illustrates RF eye pattern when the addition ratio of Sb and Te is 20 atomic percents.

As the ratio of additional elements is higher, the eye pattern becomes clear. The jitter is occurred since the changing point of regenerating signal does not agree to the changing point of original signal on the time axis, and the eye pattern becomes clearer as the signal interference becomes less. Thus, in FIG. 13A to FIG. 13C, the higher the addition ratio of Sb and Te to Ag of the first recording layer 110 is, the better the jitter character of the optical recording medium is. Therefore, it is desirable that the ratio of Sb and Te becomes higher in the first recording layer 110 according to the optical recording medium of the present invention.

Figure 14:
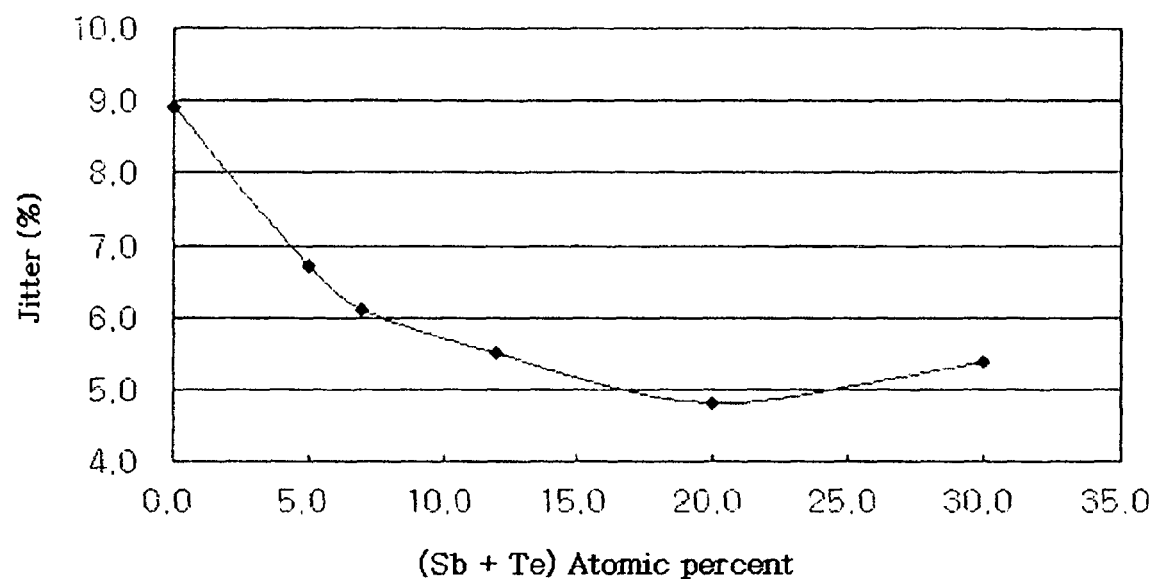
FIG. 14 is a view illustrating jitter according to the addition ratio in case of adding Sb and Te to the first recording layer material (Ag) of the optical recording medium according to one embodiment of the present invention.

FIG. 14 is a view illustrating jitter according to the addition ratio in case of adding Sb and Te to a material (Ag) of the first recording layer of the optical recording medium according to one embodiment of the present invention.

It is confirmed that the jitter is decreased when Sb and Te are added to the first recording layer 110 of the optical recording medium.

The superiority of performance according to the optical recording medium of the present invention is manifested when the information recording layer 100 is one layer as well as when the information recording layer 100, 200 is two or more layers. One or more information layers in two or more information recording layers 100, 200 may be combined by constitutional element, thickness ratio, sum of thicknesses, etc. as shown above.

From the preferred embodiments for the present invention, it is noted that modifications and variations can be made by a person skilled in the art in light of the above teachings. Therefore, it should be understood that changes may be made for a particular embodiment of the present invention within the scope and spirit of the present invention outlined by the appended claims.

What is claimed is:

1. An optical recording medium for recording information by a mechanism forming a substance having different reflexibility from surrounding substance in an information recording layer through an irradiated laser beam, comprising:
   a substrate;
   a reflective layer located on the upper side of the substrate and reflecting an incident laser beam; and
   an information recording layer located on the reflective layer,
   wherein the information recording layer includes:
   a first recording layer containing a compound in the form of $A_xB_{1-x}$ ($0.8 \leq X \leq 0.9$), wherein A is Ag, and B is Sb and Te; and
   a second recording layer containing at least one element selected from the group consisting of Si, Sn, Sb and Ge,
   wherein the ratio of thickness of the second recording layer to the first recording layer is greater than two.

2. The optical recording medium of claim 1, wherein the information recording layer further comprises at least one of an additional first or second recording layer, and the first recording layer and the second recording layer are laminated in turn.

3. The optical recording medium of claim 1, wherein the thickness of the information recording layer is between 90 Å and 200 Å.

4. The optical recording medium of claim 1, wherein the information recording layer further includes a recording sensibility promotion layer formed on at least one side of the information recording layer and containing at least one element selected from the group consisting of Sn, Zn, Pb, Bi, Tl, Te, Se, S, Al, Ga, Ge, Cd, I and In.

5. The optical recording medium of claim 1, further including a dielectric layer formed on at least one side of the information recording layer.

6. The optical recording medium of claim 5, wherein the thickness of the dielectric layer formed on the first recording layer is 80 nm or less.

7. The optical recording medium of claim 5, wherein the thickness of the dielectric layer formed on the second recording layer is 50 nm or less.

8. An optical recording medium for recording information by a mechanism forming a substance having different reflexibility from surrounding substance in an information recording layer through an irradiated laser beam, comprising:
   a substrate;
   a reflective layer located on the upper side of the substrate and reflecting an incident laser beam;
   at least two information recording layers located on the reflective layer; and
   a separation layer formed between the information recording layers,
   wherein each information recording layer includes:
   a first recording layer containing a compound in the form of $A_xB_{1-x}$ ($0.8 \leq X \leq 0.9$),
   wherein A is Ag, and B is Sb and Te; and
   a second recording layer containing at least one element selected from the group consisting of Si, Sn, Sb and Ge,
   wherein the ratio of thickness of the second recording layer to the first recording layer is greater than two.

9. The optical recording medium of claim 8, wherein at least one of the information recording layers further comprise at least one of an additional first or second recording layer, and the first recording layer and the second recording layer are laminated in turn.

10. The optical recording medium of claim 8, wherein the thickness of one of the information recording layers is between 90 Å and 200 Å.

11. The optical recording medium of claim 8, wherein the ratio of thickness of the first recording layer to the second recording layer in one of the information recording layers is different from that of another information recoding layer.

12. The optical recording medium of claim 8, wherein the sum of thickness of the first recording layer and the second recording layer in one of the information recoding layers is different from that of another information recoding layer.

13. The optical recording medium of claim 8, wherein one of the information recording layers further includes a recording sensibility promotion layer formed on at least one side of one of the information recording layers and containing at least one element selected from the group consisting of Sn, Zn, Pb, Bi, Tl, Te, Se, S, Al, Ga, Ge, Cd, I and In.

14. The optical recording medium of claim 8, further including a dielectric layer formed on at least one side of one of the information recording layers.

15. The optical recording medium of claim 14, wherein the dielectric layer is formed on the first recording layer of one of the information recording layers, and a thickness of the dielectric layer is 80 nm or less.

16. The optical recording medium of claim 14, wherein the dielectric layer is formed on the second recording layer of one of the information recording layers, and a thickness of the dielectric layer is 50 nm or less.

* * * * *